United States Patent
Alam et al.

(10) Patent No.: US 7,409,351 B2
(45) Date of Patent: Aug. 5, 2008

(54) METHOD AND SYSTEM FOR SPLITTING AN ORDER IN A FLEXIBLE ORDER TRANSACTION SYSTEM

(75) Inventors: Muhammad M. Alam, Santa Clara, CA (US); Ruediger Meyfarth, Heidelberg (DE); Sam S. Hwang, Los Altos, CA (US); Rama Koti R. Konatham, Sunnyvale, CA (US)

(73) Assignee: SAP AG, Walldorf (DE)

( * ) Notice: Subject to any disclaimer, the term of this patent is extended or adjusted under 35 U.S.C. 154(b) by 532 days.

(21) Appl. No.: 10/851,287

(22) Filed: May 21, 2004

(65) Prior Publication Data
US 2005/0261925 A1 Nov. 24, 2005

(51) Int. Cl.
- *G06Q 10/00* (2006.01)
- *G06Q 30/00* (2006.01)
- *G06Q 90/00* (2006.01)

(52) U.S. Cl. .............................. 705/1; 705/26; 705/29; 705/500

(58) Field of Classification Search .................. 705/26, 705/27, 1, 29, 400, 500
See application file for complete search history.

(56) References Cited

U.S. PATENT DOCUMENTS

| | | | |
|---|---|---|---|
| 6,023,683 A * | 2/2000 | Johnson et al. | 705/26 |
| 6,263,317 B1 * | 7/2001 | Sharp et al. | 705/26 |
| 6,904,411 B2 * | 6/2005 | Hinkle | 705/35 |
| 7,257,552 B1 * | 8/2007 | Franco | 705/28 |
| 7,295,990 B1 * | 11/2007 | Braumoeller et al. | 705/7 |
| 2001/0027447 A1 | 10/2001 | Matsuura | |
| 2002/0069103 A1 | 6/2002 | Puri et al. | |
| 2002/0077979 A1 * | 6/2002 | Nagata | 705/40 |
| 2002/0099585 A1 | 7/2002 | Locke | |
| 2003/0018490 A1 * | 1/2003 | Magers et al. | 705/1 |
| 2003/0093388 A1 * | 5/2003 | Albright | 705/400 |
| 2004/0139001 A1 * | 7/2004 | Henriques et al. | 705/39 |
| 2004/0143488 A1 | 7/2004 | Wang | |
| 2005/0131779 A1 * | 6/2005 | Kitamura et al. | 705/29 |

FOREIGN PATENT DOCUMENTS

JP   2001154722 A   *   6/2001

OTHER PUBLICATIONS

Perkins, Hershauer, Foroughi, Delaney; "Can a negotiation support system help a purchasing manager?" Spring, 1996; International Journal of Purchasing and Materials Management, v32 n2 p37(9).*

* cited by examiner

*Primary Examiner*—Jeffrey A Smith
*Assistant Examiner*—Adam Levine
(74) *Attorney, Agent, or Firm*—Kenyon & Kenyon LLP

(57) ABSTRACT

A method and system for splitting an order in a flexible order transaction system where yield, scrap, and work-in-process (WIP) are calculated for reporting points in the parent order process and certain yield, scrap, and/or work-in-process units are transferred from reporting points in the parent order to mapped reporting points in the child order. The transfer from the parent order to the child order being possible at several mapped reporting points for the single split order action. If the WIP to be transferred at a mapped reporting point exceeds the available WIP, WIP may be taken from preceding or subsequent reporting points.

22 Claims, 6 Drawing Sheets

METHOD AND SYSTEM FOR SPLITTING AN ORDER IN A FLEXIBLE ORDER TRANSACTION SYSTEM

FIELD OF THE INVENTION

The present invention relates to a method and system for splitting an order in a flexible order transaction system. In one embodiment of the present invention, the flexible order system relates to a shop floor manufacturing system controlling an already in progress production order.

BACKGROUND OF THE INVENTION

In conventional flexible order transaction systems in manufacturing, splitting an order that is already in progress is possible but limited to occurring at one particular stage in the production process. For example, if a production process involves 10 steps P1-P10, an order may be split at one particular step, for example, P5. At the conclusion of each step, a production management system may receive reporting regarding the status of processing up to that point—the conclusion of each step thereby termed "reporting points." The step or reporting point where an order is split is mapped to a step/reporting point in the new child order resulting from the split and a quantity is transferred to the new child order. This mapping is limited to a single pair of corresponding steps/reporting points between the two processes. Successfully processed yield and as yet unprocessed work-in-process (WIP) quantities may be transferred but conventional systems limit the transfer of WIP to only the amount available in the original parent order at the step/reporting point where the order split occurs—referred to as "hard splitting" of the WIP. Conventional flexible order transaction systems do not provide the ability to perform at one time the splitting of an in progress production order at multiple reporting points across the production process. Even the split at one reporting point in the process is limited to the quantity of WIP available at that reporting point in the original parent order.

Several existing conventional flexible order transaction systems incorporate split order functionality for production orders but do not provide for a single splitting of an in progress order at multiple reporting points of the production process. They include the SAP® Production Planning Module for Production Orders, the SAP® Production Planning Module for Process Industries Module, and lost split functionality in the Oracle® Shop Floor Management 11i system. These conventional systems limit a single split order to the transfer of work-in-process (WIP) items at only one point in the production process not at multiple points throughout the process. These conventional systems also limit the transfer of WIP to only the quantity available at the point where the order is split.

Providing greater flexibility in splitting already in progress production orders is important for a number of reasons. Unexpected capacity constraints can be overcome by splitting the order to take advantage of parallel processing on separate equipment when it is available. The greatest efficiency in solving these constraints exists where the split can occur at several reporting points in the process and where the transfer of WIP is more flexible than the "hard splitting" as described above. Greater efficiency may also be realized by dividing lots into efficient production lot sizes. For example, in semiconductor manufacturing after wafers are cut into die, a lot may be split into more manageable assembly lots. More flexibility in splitting an order (i.e., the lot) can improve and expedite the creation of orders or lots with more manageable processing sizes. For example, a portion of an order can be expedited to match customer demand if a fraction of the order is needed immediately. Improved flexibility in splitting an order can also be used to split good material from material requiring reprocessing (reworking) in order to expedite product delivery. Similarly, flexible splitting of an order can allow separation of orders based on the grade of material determined during processing. Flexible splitting of an in progress order may also allow the transfer of WIP to multiple points in a different process structure of a child order.

SUMMARY

In one embodiment of the present invention, a method for splitting an order in a flexible order transaction system where the order is currently in progress allows the production to be split at multiple points in the production process overcoming some of the limitations of conventional systems. According to this embodiment, a request to split the order specifies a quantity of the product to be split to a child order. At each reporting point in the process for the parent order, the quantity of successfully processed product (i.e., the yield), the quantity of unsuccessfully processed product that cannot be reprocessed (i.e., the scrap), and the as of yet unprocessed product (i.e., the work-in-process or WIP) are determined. In another embodiment, the WIP may include not only the as of yet unprocessed product but also unsuccessfully processed product that can be reprocessed (i.e., reworked) and/or the product that is currently being processed. The reporting points in the parent order are mapped to reporting points in the child order and some of the yield, scrap, and WIP at each mapped reporting point in the parent order are split and transferred to the corresponding mapped reporting point in the child order. The method in this embodiment allows the splitting of production from multiple reporting points in a single split order transaction. For example, using the SAP® Flexible Order Transaction in the Advanced Planning and Optimization (APO), a single split order transaction may include the splitting of production across multiple reporting points. The mapping between the process associated with the parent order and the process associated with the child order may already exist in a mapping table of the flexible order transaction system or may be specified during the split order request in separate embodiments of the present invention. Even where a user specifies mapping, the user does not have to specify all the mapping between reporting points in the parent and child orders for the transfer of WIP as is required in conventional systems. Additionally, detail mapping does not need to be provided when the order is split. For example, the transfer of WIP can be automatically determined by the system where, if the need to split WIP from a reporting point in the parent order exceeds the available WIP, WIP may be obtained from preceding reporting points according to one embodiment of the present invention. In another embodiment, under these same circumstances, WIP may be obtained from subsequent reporting points to meet a shortage in the available WIP that is unable to satisfy the need for WIP to be split at a reporting point.

DETAILED DESCRIPTION

In a flexible order transaction system, an order may be split allowing production to be transferred from several points in the production process of the original parent order to corresponding points in the production process of the new parent order and/or child orders according to one embodiment of the present invention. The splitting of an order (i.e., the original parent order) results in the creation of 2 or more new orders. In one embodiment of the present invention, these 2 or more new orders may include a new parent order and one or more new child orders. The new parent order has the same structure and processing as the original parent order while the new child order(s) may involve different processing (i.e., process structure) or a different final product. In an alternative embodiment, the splitting of a parent order results in 2 or more new child orders, which may have the same or different process structure as the parent order.

The processing or process structure is the actual work (i.e., processing) performed on the production inputs (i.e., the components) using the process resources (i.e., resources) to transform a product from components at the start of the process to a final product according to one embodiment of the present invention. The actual work (i.e., the processing or process structure) that is performed may differ between the parent order and the child order. In one embodiment, a child order may have the same process structure as the parent order from which it is split. A child order may have a different process structure from the parent order in another embodiment. If the process structure of the child order is different from the parent order, mapping between the processes as discussed below may be necessary. In another embodiment, a child order may represent a change in the final product from the final product of the parent order from which it is split.

Figure 1:
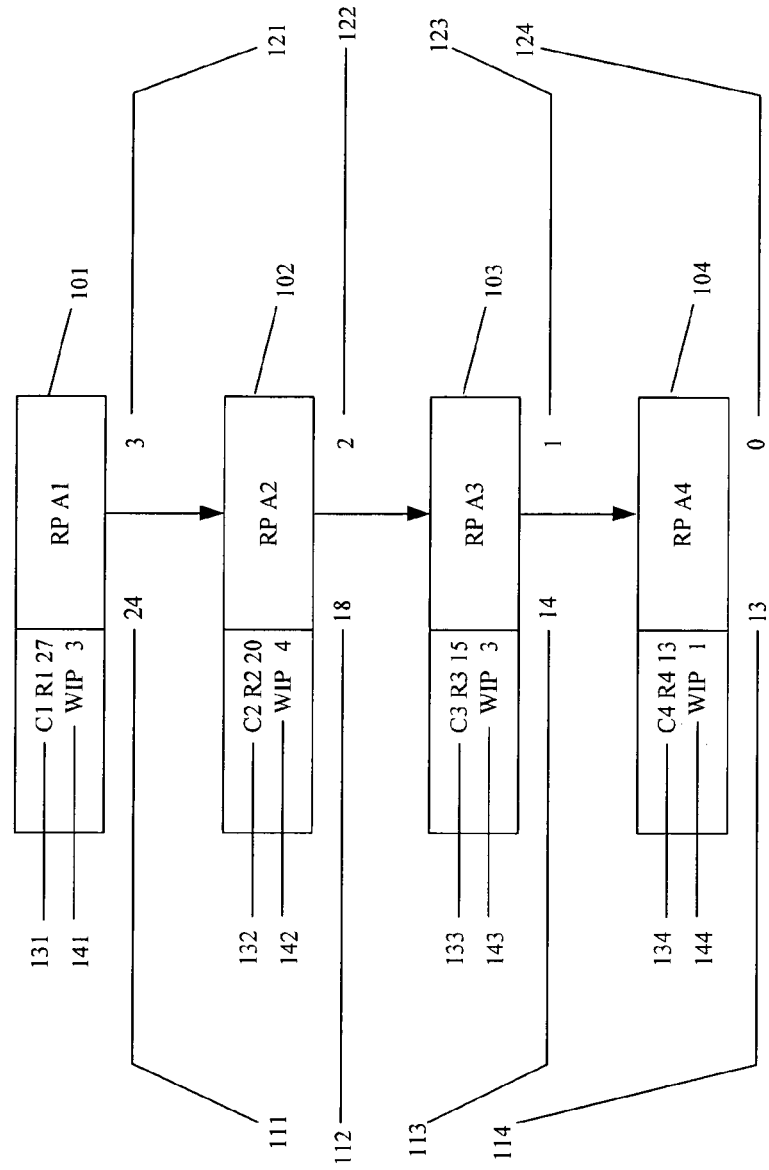
FIG. 1 is a diagram illustrating the processing of an example production order before the order is split according to one embodiment of the present invention.

FIG. 1 is a diagram illustrating the processing of an example production order before the order is split according to one embodiment of the present invention. The example embodiment shown in FIG. 1 depicts an order, Order_A, 100 for the production of 30 units of a product. A production process, according to one embodiment of the present invention, is the process needed to convert inputs (e.g., components and resources) into a product or to modify a manufactured item in order to produce a desired finished product. The inputs into the production process can be considered components, the physical items required to produce the product, and resources, the labor, machinery, and other services required to produce the product. In the example embodiment shown in FIG. 1, a production process may be divided in several discrete steps representing particularly distinct or distinguishable portions of the process at the conclusion of which an accurate accounting of the progress of an order may be made. A reporting point (RP) is the conclusion of one of these portions or steps in the production process and at which the status of the order is confirmed. The order status may be determined by any conventional means including manual and automated reporting on order status. In the embodiment shown in FIG. 1, the production process associated with Order_A 100 includes four reporting points (RP): RP A1 101, RP A2 102, RP A3 103, and RP A4 104.

At each reporting point (RP), the inputs for the product are consumed as part of the shop floor production process according to one embodiment of the present invention. At each reporting point, a unit of the product is either successfully processed—ending up as "yield"—or is unsuccessfully processed—ending up as "scrap". Yield is the quantity of the product that has already been processed at an activity level reported on at the reporting point. Scrap is the quantity that at a given activity level (reporting point) will no longer be further processed. The remaining quantity still undergoing processing or still waiting for processing to initiate for the reporting point (RP) is considered the Work-in-Process (WIP) quantity. According to one embodiment of the present invention, if an unsuccessfully processed unit of the product can be reprocessed, it is considered WIP instead of scrap, which can't be reprocessed. In other words, according to this embodiment, an unsuccessfully processed unit of product at a reporting point is considered scrap if it can't be reprocessed while, if it can be reprocessed, it is considered WIP and eventually reprocessed—scrap is not salvageable.

At each reporting point, the quantity of yield, scrap, and WIP equal the yield from the preceding reporting point according to one embodiment of the present invention. At the first reporting point, the quantities of yield, scrap, and WIP equal the order quantity according to this embodiment. For example in FIG. 1, Order_A 100 is placed for a quantity of 30 units of the product. At reporting point A1 101, the first reporting point, the quantity of yield, scrap, and WIP equal the 30 units for the order. The quantity of yield at RP A1 101 is 24 units 11 while the quantity of scrap is 3 units 121 and the quantity of WIP is 3 units 141 totaling the 30 units for the order 100. At reporting point A2 102, the second reporting point, the quantity of yield, scrap, and WIP need to equal the 24 units of yield 111 at the preceding RP A1 according to this embodiment of the present invention. The quantity of yield at RP A2 102 is 18 units 112 while the quantity of scrap is 2 units 122 and the quantity of WIP is 4 units 142 totaling the 24 units of yield 111 at RP A1 101. The yield quantity at the final reporting point in a production process represents the total quantity of the finished product produced so far. For example, the final reporting point shown in FIG. 1 is reporting point A4 104. At RP A4 104, the quantity of yield is 13 units 114 representing the total quantity of the finished product produced up to this point.

In the example shown in the embodiment in FIG. 1, an order 100, Order_A, is placed for a quantity of 30 of a product. The process for Order_A includes four reporting points in the example shown in FIG. 1. At reporting point A1 101, 24 units 111 of the product have been successfully processed and are considered yield at this reporting point. Three units 121 have been unsuccessfully processed and can't be reworked (i.e., reprocessed) and have become scrap at this reporting point. A remaining 3 units 141 of the product have yet to begin or complete the production process up to reporting point A1 and are consider WIP. Components and resources are used in the processing occurring up to RP A1 101. In the example embodiment in FIG. 1, 1 unit of component and 1 unit of resource are used per unit processed. At reporting point A1 101, the quantity of components (C1) and resources (R1) used each equal 27 units 131 for the units of yield 111 and scrap 121 that have been processed.

Of the 24 units of yield 111 at RP A1 101, 18 units 112 of the product have been successfully processed and are considered yield at reporting point A2 102. Two units 122 have been unsuccessfully processed and can't be reworked (i.e., reprocessed) and are scrap at RP A2 102. Four units 142 of the product (out of the 24 111) remain to be processed or to complete processing and are WIP at RP A2 102. The quantity of components (C2) and resources (R2) used for the processing to reporting point A2 102 each equal 20 units 132 for the units of yield 112 and scrap 122 that have been processed.

At reporting point (RP) A3 103, only 14 units 113 of the 18 units 112 of the product yielded at RP A2 102 have been successfully processed and have become yield. One unit 123 has been unsuccessfully processed and can't be reworked (i.e., reprocessed) and, therefore, is now scrap at RP A3 103. Three units 143 remain to be processed or to complete processing at RP A3 103 and are considered WIP. The quantity of components (C3) and resources (R3) used for the processing to reporting point A3 103 each equal 15 units 133 for the units of yield 113 and scrap 123 that have been processed.

Of the 14 units 113 of the product yielded (i.e., successfully processed) at RP A3 103, 13 units 114 have been successfully processed (are yield) at RP A4 104. Because RP A4 104 is the final reporting point, the 13 units 114 of yield at RP A4 104 are finished products of the process A1-A4 for Order_A 100 according to this embodiment of the present invention. There is no scrap 124 at RP A4 104 and the remaining one unit 144 is WIP at this reporting point. The quantity of components (C4) and resources (R4) used for the processing to reporting point A4 104 each equal 13 units 134 for the units of yield 114 and scrap 124 that have been processed.

According to the example depicted in FIG. 1, a quantity of 30 units 100 is ordered with 13 units 114 of final product produced at RP A4 104. The successfully processed yield throughout the process includes 24 units 111 at RP A1 101, 18 units 112 at RP A2 102, 14 units 113 at RP A3 103, and 13 units 114 at RP A4 104. Of the quantity of 30 units 100, 6 units have been unsuccessfully processed and are not capable of being reworked (i.e., reprocessed) and are considered scrap: 3 units 121 at RP A1 101, 2 units 122 at RP A2 102, 1 unit 123 at RP A3 103, and none 124 at RP A4 104. Of the quantity of 30 ordered, 11 units remain as WIP at the various reporting points: 3 units at RP A1, 4 units at RP A2, 3 units at RP A3, and 1 unit at RP A4. The example represented in FIG. 1 indicates that only the WIP remains to be processed. Yield and scrap require no further processing at the different reporting points. Therefore, only 11 units of the component (i.e., the WIP) remain to be processed: 3 units 141 at RP A1 101, 4 units 142 at RP A2 102, 3 units 143 at RP A3 103, and 1 unit 144 at RP A4 104. The final yield (i.e., the finished product) of 13, the total scrap of 6, and the total work-in-process (WIP) of 11 equal the total order quantity of 30 according to this embodiment.

Figure 2:
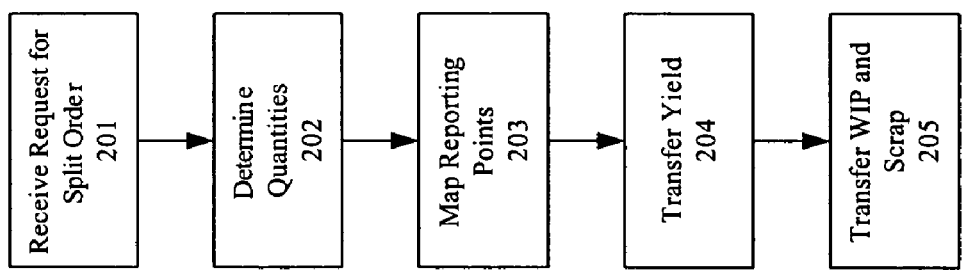
FIG. 2 is a diagram depicting the order splitting process according to one embodiment of the present invention.

FIG. 2 is a diagram depicting the order splitting process according to one embodiment of the present invention. The first step in the process for splitting an order is to "Receive Request for Split Order" 201. The request may be received in any number of ways according to various embodiments of the present invention. In the example embodiment, the request is received from the customer placing the order through a flexible order transaction system, a software application allowing the flexible orders to be placed including the splitting of production orders already in progress. The request to split the order needs to specify the quantity to be split to each child order. The total number of child orders and the quantity remaining with the parent order can be determined from the quantity to be split to each child order but may, in an alternative embodiment, be specified by the user (e.g., the customer).

In the "Determine Quantities" step 202, the quantities for each reporting point of the parent order are determined. According to this step, the yield, scrap, and work-in-process (WIP) are calculated at each reporting point in the process for the parent order. For example, using the information provided in FIG. 1, reporting points A1-A4 101-104 exist for the process used to implement Order_A. At reporting point A1 101, the following quantities of the product are determined: 24 units of yield 111, 3 units of scrap 121, and 3 units of WIP 141 all equaling the 30 units 100 requested in the original order. At reporting point A2 102, the following quantities of the product are determined: 18 units of yield 112, 2 units of scrap 122, and 4 units of WIP 123 all equaling the 24 units of yield 111 ready for further processing after RP A1 101. At reporting point A3 103, the following quantities of the product are determined: 14 units of yield 113, 1 unit of scrap 123, and 3 units of WIP 143 all equaling the 18 units of yield 112 ready for further processing after RP A2 102. At reporting point A4 104, the following quantities of the product are determined: 13 units of yield 114, no units of scrap 124, and 1 unit of WIP 144 all equaling the 14 units of yield 113 ready for further processing after RP A3 103.

In the "Map Reporting Points" step 203, mapping data between the reporting points of the processes corresponding to the parent order (e.g., Order_A) and the child order(s) (e.g., Order_B) is determined. The mapping data may be determined in different ways according to various embodiments of the present invention. In one embodiment, the mapping data may be determined by retrieving mapping data already stored for the processes. For example, data from a mapping table containing the reporting point mapping between the processes associated with the parent order, Order_A, and the child order, Order_B, may be retrieved. In another embodiment, a user may specify the mapping data when the split order is requested. For example, when the user enters the split order request using flexible order transaction software running on a computing device such as a computer, the user may specify that reporting points A1, A2, A3, and A4 in the original parent order correspond to reporting points B1, B3, B6, and B7 respectively in the new child order. In another embodiment of the present invention, the mapping data may be calculated using other variables to determine at which reporting points similar processing has occurred.

The mapping data does not need to include mapping from all the reporting points in the process associated with the parent order to corresponding reporting points in the process associated with the child order, according to this embodiment-though all reporting points may be mapped. For example, the mapping between a parent order, e.g., Order_A, with associated reporting points A1-A4 may only map 3 of the reporting points (e.g., A1, A2, and A4) with a child order, e.g., Order_C. Just as all the reporting points in the process associated with the parent order do not need to be mapped, all the reporting points in the process associated with the child order also do not need to be mapped to the parent order. For example, a child order, e.g., Order_C, with associated reporting points C1-C6 may only have 3 reporting points mapped to the parent order, e.g., Order_A. In one embodiment of the present invention, two or more reporting points associated with a parent order (e.g., Order_A) may be mapped to a single reporting point associated with a child order (e.g., Order_D). This may occur where the additional processing for the second reporting point in the parent order (e.g., Order_A) does not add anything above the processing for the first reporting point in the parent order in relation to the processing that needs to occur in the child order (e.g., Order_D). For example, under these circumstances, reporting points A2 and A3 associated with a parent order, Order_A, may be mapped to a single reporting point D3 associated with a child order, Order_D. In one embodiment of the present invention, a single reporting point associated with a parent order (e.g., Order_A) may be mapped to two or more reporting points associated with a child order (e.g., Order_E). For example, reporting point A3 associated with a parent order, Order_A, may be mapped to reporting points E4 and E5 associated with a child order, Order_E. The above examples help illustrate the implementation of mapping in various embodiments of the present invention. Any conventional mapping means may be used to determine and supply the mapping data required.

In the "Transfer Yield" step 204, yield (i.e., the successfully processed units) is transferred from the parent order (e.g., Order_A) to the child order (e.g., Order_B) at each mapped reporting point. For example, if reporting points A1, A2, A3, and A4 associated with Order_A (the parent order) are mapped respectively to reporting points B1, B3, B6, and B7 associated with Order_B (the child order), yield is transferred from Order_A to Order_B at each of these mapped reporting points. Yield is therefore transferred between the mapped reporting point pairs: RP A1-RP B2, RP A2-RP B3, RP A3-RP B6, and RP A4-RP B7. The component and resource usage for the transferred yield is also transferred to the child order.

In the "Transfer WIP and Scrap" step 205, WIP and scrap are transferred from the parent order (e.g., Order_A) to the child order (e.g., Order_B) at each mapped reporting point. The quantity of WIP and Scrap transferred is the amount necessary to balance each reporting point—where the quantity of yield, scrap, and WIP equal the quantity of yield from the prior reporting point or, for the first reporting point in the child order, they equal the child order quantity. This process is described in greater detail below. In various embodiments of the present invention, preference may be given to transferring WIP over scrap or scrap over WIP as well as only transferring WIP or only transferring scrap. In one embodiment of the present invention, only WIP is transferred to the child process and, if enough WIP is not available for transfer at the mapped reporting points, WIP is taken from either previous reporting points ("soft down") or later reporting point ("soft up") as described below. Associated component and resource usage for any transferred scrap may also be transferred to the child order.

Figure 3:
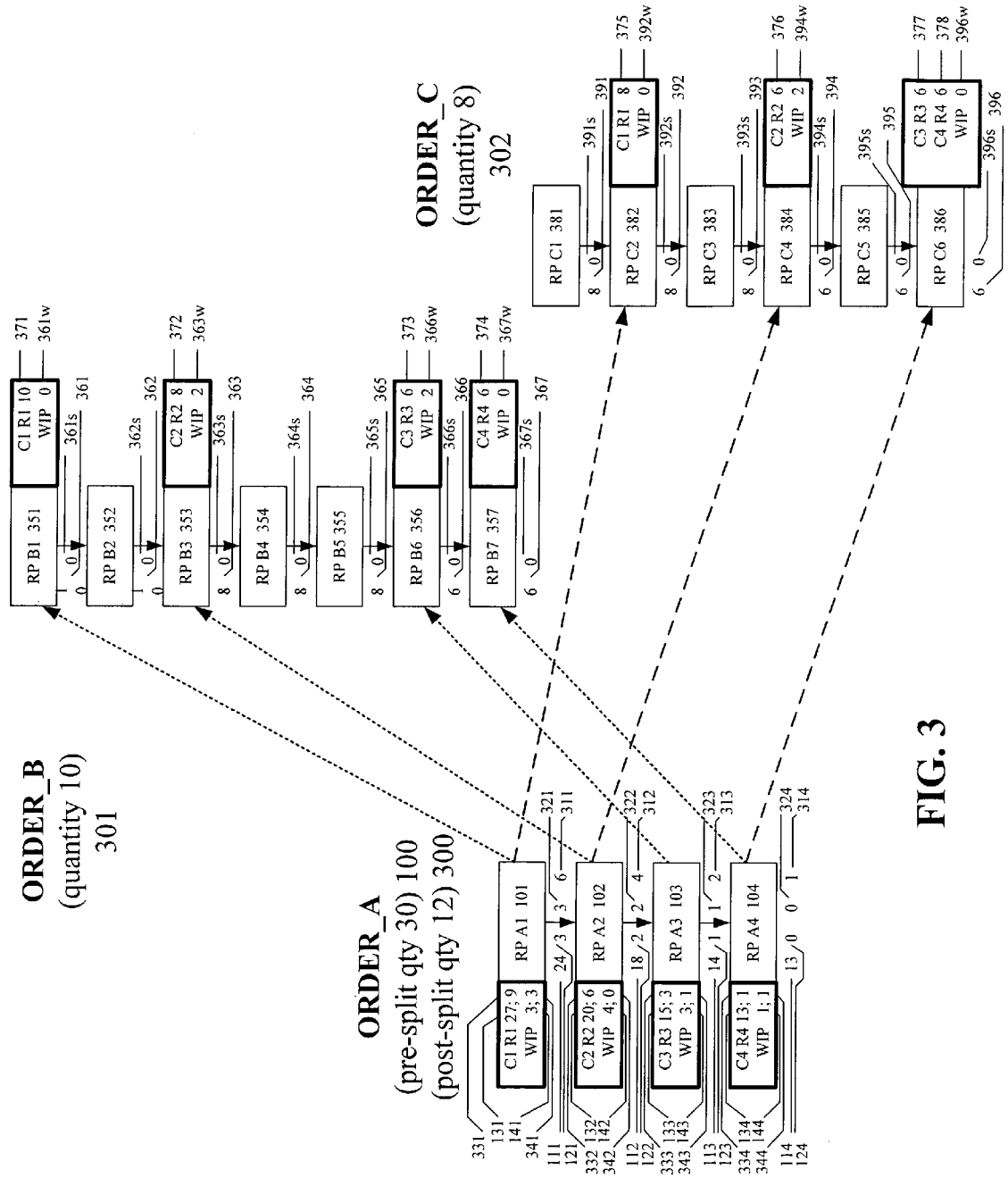
FIG. 3 is a diagram illustrating the splitting of an order according to one embodiment of the present invention.

FIG. 3 is a diagram illustrating the splitting of an order according to one embodiment of the present invention. The parent order, Order_A, is the original order as shown in FIG. 1. According to the example shown in FIG. 3, Order_A 100 is split to create 3 orders: Order_A 300, Order_B 301, and Order_C 302. The original Order_A 100 called for a quantity of 30 100 of the product. The splitting of the order is in essence a division of this order quantity between the resulting orders according to the example shown in FIG. 3. The original quantity and the new quantities are reflected as follows:

|  | Original (Pre-Split) Quantity | Resulting (Post-Split) Quantity |
| --- | --- | --- |
| Order_A | 30 | 12 |
| Order_B | — | 10 |
| Order_C | — | 8 |

According to the example shown in FIG. 3, yield is transferred from the original order, Order_A, 100 to the two new child orders, Order_B 301 and Order_C 302. The method of determining how the split occurs depends on the mapping between reporting points in the respective processes for the orders and is outlined below.

In the example embodiment shown in FIG. 3, yield is transferred from the parent order 100, Order_A, to the new child orders, Order_B 301 and Order_C 302. The yield is transferred according to the mapping between the reporting points associated with Order_A 100, 300 and the reporting points associated with the child orders, Order_B 301 and Order_C 302. At reporting point A1 101, 24 units of successfully processed yield 111 are available for transfer to the child orders. These 24 units of yield 111 are less than the 30 units 100 originally ordered and part of Order_A because of 3 units of scrap 121 occurring during the processing up to reporting point A1 101 and because of 3 units of work-in-process (WIP) 141 not yet fully processed at RP A1 101. Reporting point A1 101 maps to reporting point B1 351 (associated with child Order_B) and reporting point C2 382 (associated with child order Order_C). In the example embodiment shown in FIG. 3, the complete child order amounts are transferred. For example, 10 units of yield 301 are transferred from RP A1 101 to RP B1 351 representing the order quantity of 10 for Order_B 301 while 8 units of yield 302 are transferred from RP A1 101 to RP C2 382 representing the order quantity of 8 for Order_C 302. The remaining 6 units of yield 311 stay with the parent order, Order_A 300. The mapping between RP A1 101 and RP C2 382 indicates that similar processing has occurred at the corresponding (i.e., mapped) reporting points. For this reason, the transferred yield at RP C2 382 does not require the processing at RP C1 381 and the yield 392 at RP C2 382 also applies at RP C1 381 for this initial transfer of yield according to this embodiment of the present invention.

At reporting point A2 102, 18 units of successfully processed yield 112 are available for transfer to the child orders representing a decrease in 6 units from the original yield of 24 111 at RP A1 101. This decrease is due to 2 units of scrap 122 occurring during the processing from RP A1 101 to RP A2 102 and 4 units of WIP 142 that exist at RP A2 102. Reporting point A2 102 maps to reporting point B3 353 (associated with child Order_B) and reporting point C4 384 (associated with child Order_C). The yield at all the corresponding reporting points must equal the original yield at reporting point A2 102 and, therefore, a reduction of 6 units must occur reflecting the reduction of 6 units in yield from RP A1 101 to RP A2 102. According to the example embodiment shown in FIG. 3, two units of yield are reduced at corresponding reporting points for each of the orders: Order_A 300, Order_B 301, and Order_C 302. The result is that at RP B3 353 yield drops 2 units to become 8 units 363, at RP C4 384 yield drops 2 units to become 6 units 394, and at RP A2 102 yield drops 2 units to become 4 units 312. In the example embodiment depicted in FIG. 3, the reduction in yield is uniformly distributed over the orders. In other embodiments of the present invention, the reduction in yield may be weighted heavier toward the parent or child orders. In one embodiment, the reduction in yield may first be applied to the parent order then any remaining reduction may be applied to the child order(s). In an alternative embodiment, the reduction in yield may first be applied to the child order(s) with any remaining reduction applied to the parent order. Describing the change in yield that occurs along the production process as an allocation of decreased yield is only used for the purpose of explanation. The distribution of yield at each of the mapped reporting points is an important step in the order splitting process.

At reporting point (RP) A3 103, 14 units of successfully processed yield 114 are available for transfer to the child orders representing a decrease in 4 units from the yield of 18 112 at RP A2 102. This decrease is due to 1 unit of scrap 123 occurring during the processing from RP A2 102 to RP A3 103 and 3 units of WIP 143 that exist at RP A3 103. Reporting point A3 103 maps to reporting point B6 356 (associated with child Order_B 301) but does not map to any reporting point associated with Order_C 302. As previously stated, all the corresponding reporting points must equal the original yield at reporting point A3 103 (i.e., 14 units) and, therefore, must reflect the reduction in 4 units of yield at RP A3 103. No change in yield is implemented for Order_C 302 because there are no reporting points associated with Order_C 302 that correspond (i.e., map) to RP A3 103 in the parent order, Order_A 100, 300. The previous reporting point in the parent order 100, 300 that had a corresponding (i.e., mapped) reporting point in the child order Order_C 302 was RP A2 102. As previously stated, in the example embodiment shown in FIG. 3, Order_C 302 had a yield of 6 units 394 transferred from the original parent order 100 at the RP A2 102 corresponding (i.e., mapped) reporting point (RP) C4 384 associated with Order_C 302. Because no reporting point associated with Order_C 302 maps to RP A3 103, the yield for Order_C 302 remains 6 units leaving 8 units of yield for the parent order, Order_A, 300 and the other child order, Order_B 301. In the example embodiment shown in FIG. 3, the yield at RP B6 356, the reporting point associated with Order_B 301 that corresponds (i.e., maps) to RP A3 103 in the parent order 100, 300, becomes 6 units 366 reflecting a change from the previous yield of 8 units. As previously stated, the last yield transferred continues until a new reporting point associated with the child order and corresponding (i.e., mapped) to a reporting point in the parent order results in a change in the yield transferred. For this reason, the 8 units of yield transferred to RP B3 353 which corresponds to RP A2 102 remains the same at RP B4 354 and RP B5 355—RP B4 354 has a yield of 8 units 364 and RP B5 355 has a yield of 8 units 365. It is only at the next reporting point associated with Order_B 301 corresponding with a reporting point associated with the parent order 100 where a change in the yield will occur according to this embodiment of the present invention. In other embodiments of the present invention, different calculations for the transferring of yield may be used. As a result, yield becomes 6 units 366 only at RP B6 356 associated with Order_B 301 according to the example embodiment in FIG. 3. The yield at RP A3 103 becomes 2 units 313 reflecting a change from the previous yield of 4 units 312 at RP A2 102. Restating the split yield from RP A3 103, RP A3 103 retains 2 units of yield 313 (a reduction from 4 units 312) associated with Order_A 300, RP B6 356 retains 6 units of yield 366 (a reduction from 8 units 365) associated with Order_B 301, while Order_C 302 remains unchanged with 6 units of yield. The 6 units remaining with Order_C 302 do not correspond (i.e., map) to a particular reporting point because there is no reporting point associated with Order_C 302 that corresponds (i.e., maps) to RP A3 103 associated with the parent order 100.

At reporting point (RP) A4 104, 13 units of successfully processed yield 114 are available for transfer to the child orders representing a decrease in 1 unit from the original yield of 14 113 at RP A3 103. This decrease is due to 1 unit of WIP 144 that exists at RP A4 104—there is no scrap 124 at RP A4 104. Reporting point A4 104 maps to reporting point B7 357 (associated with child Order_B 301) and reporting point C6 386 (associated with child Order_C 302). As previously stated, the yield at all the corresponding reporting points must equal the original yield at reporting point A4 104—13 units of yield 114—representing a reduction of 1 unit of yield from RP A3 103 prior to the split. According to the example embodiment shown in FIG. 3, the yield associated with Order_A 300 is reduced resulting in a yield of 1 314 at RP A4 104 (a reduction from 2 313 at RP A3 103). RP A4 104 is the last reporting point associated with the parent order and no further transfer of yield needs to occur according to the embodiment of the present invention reflected in FIG. 3. The embodiment of the present invention described in FIG. 3, relates to splitting an order for the same or similar product, changing the type of product is described in U.S. Patent Application "Method and System for Changing a Production Order in a Flexible Order System", application number not yet assigned. Therefore, RP_B7 357 and RP_C6 386 are the last reporting points associated respectively with Order_B 301 and Order_C 302 and no further transfer of yield needs to occur according to this example embodiment. In an alternative embodiment, if additional reporting points were associated with Order_B 301 and Order_C 302, the yield transferred to RP_B7 357 and RP_C6 386 would also exist at any subsequent reporting points because the transferred yield from RP_A4 104 represented a final product.

In one embodiment of the present invention, after the yield is determined (i.e., transferred) from the pre-split parent order 100 to the post-split parent 300 and child orders 301, 302, WIP and scrap are transferred accordingly. In the example embodiment depicted in FIG. 3, only WIP is transferred from the pre-split parent order 100, Order_A, to the child orders 301, 302—no scrap is transferred. In an alternative embodiment of the present invention, a combination of WIP and scrap may be transferred. In the example embodiment illustrated in FIG. 3, WIP is transferred from the pre-split parent order 100 to the child orders 301, 302 to make up for any differences between the yield at a mapped reporting point (i.e., a reporting point associated with the child order that is mapped to the parent order) and a previous reporting point associated with the child order. For example, at reporting point B3 353 associated with Order_B 301, the yield is 8 units 363 which is 2 units less than the previous reporting point B2 352. According to this embodiment, 2 units of WIP 363$w$ need to be transferred from the parent order 100 to RP B3 353 to cover this difference and to keep Order_B 301 in balance. According to the example embodiment of FIG. 3, each child order 301, 302 is examined from the first associated reporting point 351, 381 to the last 357, 386 to determine where there is a difference in yield that needs to be covered by WIP. Using Order_B 301 as an example, an order quantity of 10 units 301 is requested as part of the split order. At RP B1 351 and RP B2 352, 10 units of yield 361, 362 are transferred fully meeting the requirements of the order. At RP B3 353, only 8 units of yield 363 exist representing a decrease of 2 units from RP B2 352. A reduction in yield occurs as a result of scrap or WIP so, according to this embodiment, 2 units of WIP 363$w$ need to be transferred to RP B3 353 from the parent order 100. RP B3 353 is mapped to RP A2 102, which has 4 units of WIP 142. Two units of WIP 363$w$ are transferred from RP A2 102 to RP B3 353 to satisfy this need. The yield 364 at RP B4 354 matches the yield 363 of RP B3 353 and the yield 365 at RP B5 355 matches the yield 364 at RP B4 354 and, therefore, no transfer of WIP is necessary. At RP B6 356, a yield of 6 units 366 represents a reduction in 2 units from RP B5 355, which has a yield of 8 units 365. For this reason, the transfer of 2 units of WIP 366$w$ from RP A3 103 to RP B6 356 is necessary according to this embodiment. RP B6 356 is mapped to RP A3 103, which has 3 units of WIP 143 available, so 2 units of WIP 366$w$ are transferred from RP A3 103 to RP B6 356. The 6 units of yield 367 at RP B7 357 matches the yield 366 at RP B6 356 and no additional transfer is necessary. As is shown in the example embodiment, the transfer of WIP is only necessary at the mapped reporting points in the child order according to this example embodiment of the present invention.

For the other child order in FIG. 3, Order_C 302, an order quantity of 8 302 is requested as part of the split order. At the first mapped reporting point associated with Order_C 302, RP C2 382, a yield of 8 392 was transferred which was also applied to RP C1 381. This yield 391, 392 represents the total order quantity 302 and no further transfer of scrap or WIP is necessary at these reporting points. The next mapped reporting point is RP C4 384 for which 6 units of yield 394 were transferred representing a reduction of 2 units from RP C2 382 and RP C3 383 (RP C3 383 uses the previously transferred yield 392 from RP C2 382 as previously discussed). RP C4 384 is mapped to RP A2 102, which had 4 units of WIP 142 available of which 2 units of WIP 363w were transferred to RP B3 353. The remaining 2 units of WIP 142 at RP A2 102 are transferred to RP C4 384 to cover the discrepancy in the yield. The next and final mapped reporting point is RP C6 386 for which 6 units of yield 396 were transferred. The yield 396 at RP C6 386 is the same as the previous yield 394, 395 from RP C4 384 and RP C5 385 (RP C5 385 uses the previously transferred yield 394 from RP C4 384 as previously discussed) and, therefore, it is not necessary to transfer WIP or scrap at this reporting point.

The example embodiment illustrated in FIG. 3 depicts the transfer of WIP to cover shortages in the yield of a child reporting point as compared to its immediate prior child reporting point. In alternative embodiments of the present invention, WIP, scrap, or a combination of WIP and scrap may be transferred instead of only WIP as discussed above. The end result of the split order shown in FIG. 3 is that child order, Order_B 301, has no scrap 361s-367s, the yield 361-367 shown at each reporting point 351-357 and the necessary transfer of WIP (0 units 361w at RP B1, 2 units 363w at RP B3, 2 units 366w at RP B6, and 0 units 367w at RP B7). The component and resource usage 371-374 may also be transferred as part of the split order. For child Order_C 302, the end result is no scrap 391s-396s, the yield 391-396 shown at each reporting point 381-386 and the necessary transfer of WIP (0 units 392w at RP C2 382, 2 units 394w at RP C4 384, and 0 units 396w at RP C6 386). The component and resource usage 375-378 may also be transferred as part of the split order. Because RP A3 in the parent order 100 does not map to any reporting point in Order_C 302, the component and resource usage 377 at RP A3 103 is transferred at the next reporting point RP A4 104 according to this embodiment of the present invention.

In other embodiments of the present invention, it is possible to decrease or increase the total order quantities during the split order process. According to one embodiment of the present invention, the order quantity may be increased during the split order process. For example, if the parent order has an order quantity of 30 the remaining parent order, if any, and the child order(s) may represent a quantity greater than 30. The additional quantity may result in additional WIP at the initial reporting points in the production processes. In another embodiment, the order quantity may be reduced during the split order process. For example, if the parent order has an order quantity of 30, the remaining parent order, if any, and the child order(s) may represent a quantity less than 30. The decreased quantity may result from eliminating WIP or reducing order quantity to reflect scrap at the initial reporting points of the production processes.

Figure 4:
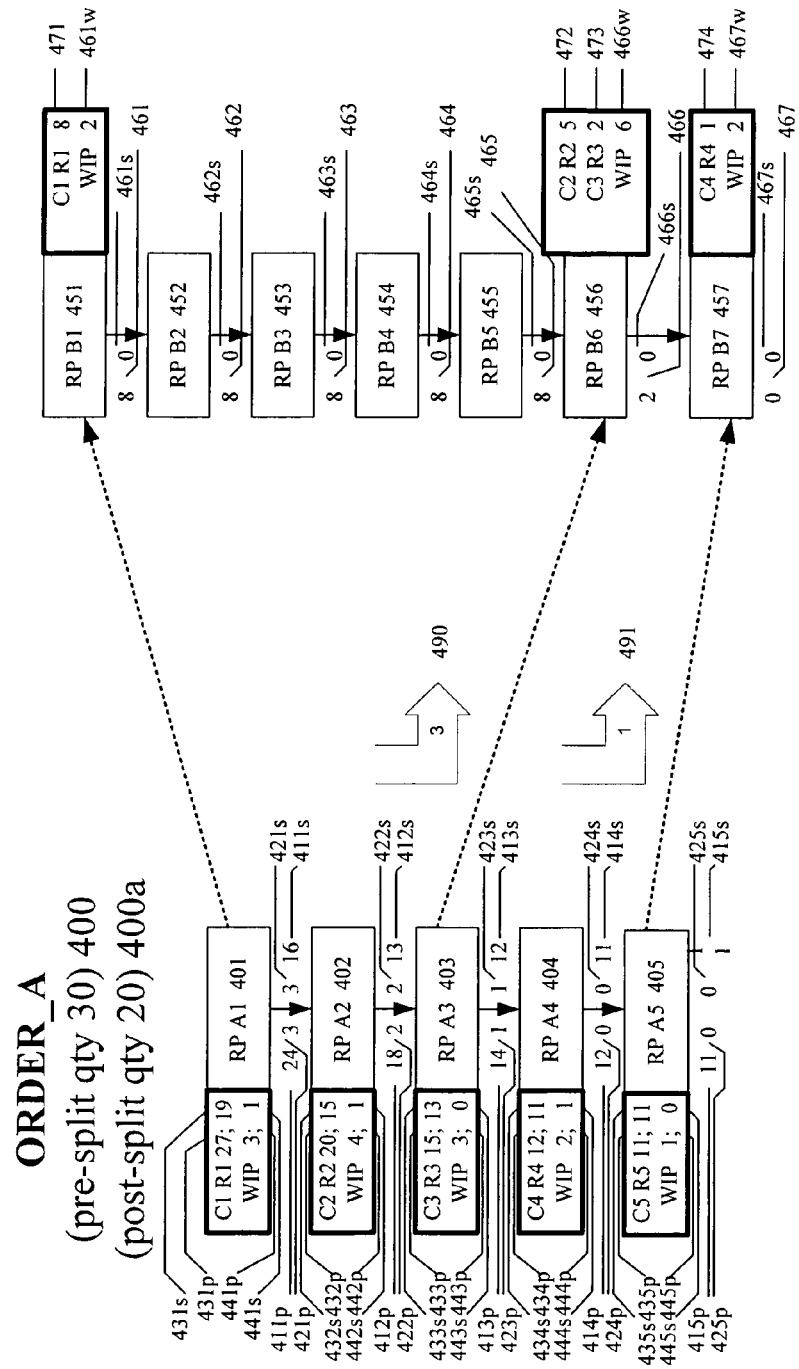
FIG. 4 is a diagram illustrating the process of transferring WIP from preceding reporting points if the demand for WIP at a reporting point exceeds the available of WIP during the order splitting process according to one embodiment of the present invention.
Figure 5:
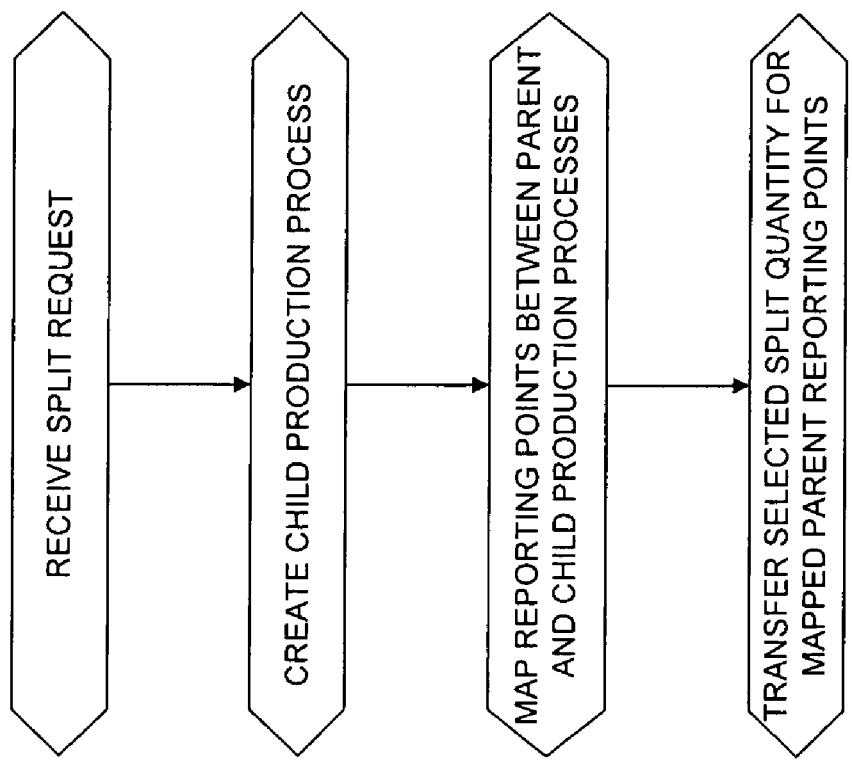
FIG. 5 is a flowchart showing a method for splitting an order according to an embodiment of the present invention.
Figure 6:
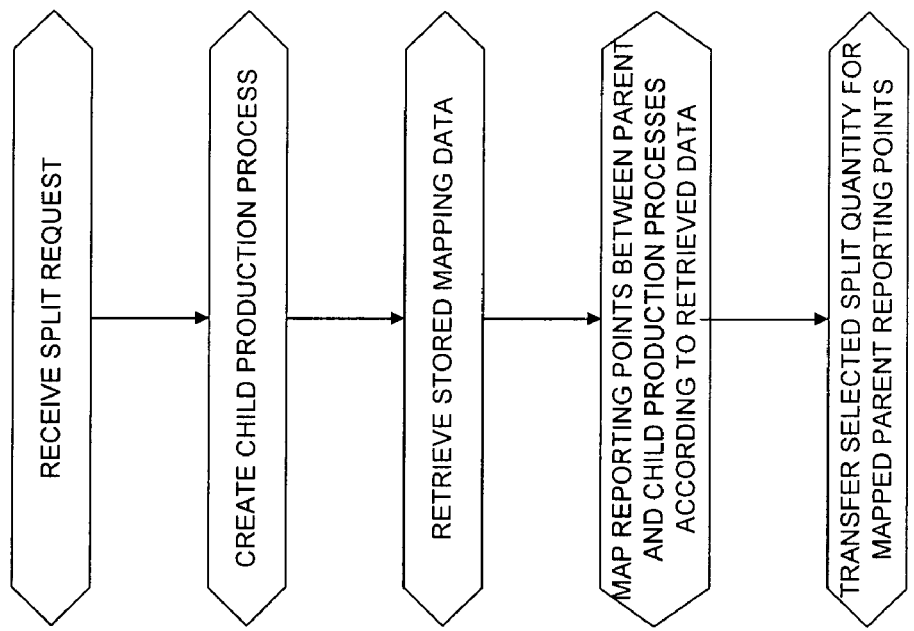
FIG. 6 is a flowchart showing a method for splitting an order according to an embodiment of the present invention.

According to one embodiment of the present invention, if the WIP to be transferred from a reporting point in the parent order to a child order(s) exceeds the amount of available WIP at the parent reporting point, WIP may be transferred from prior or preceding reporting points associated with the parent order even though these prior reporting points may not be mapped to the same reporting point(s) in the child order(s). FIG. 4 is a diagram illustrating the process of transferring WIP from preceding reporting points if the demand for WIP at a reporting point exceeds the available WIP during the order splitting processing according to one embodiment of the present invention. This process is referred to as the "soft down" transfer of WIP according an example embodiment of the present invention. In the example embodiment shown in FIG. 4, the parent order 400, Order_A, is being split into two orders: an altered parent order 400a and a child order 400b, Order_B. The original parent Order_A 400 was placed for a quantity of 30 units with the split order resulting in Order_A 400a retaining only 20 units while Order_B is placed for 10 units 400b. The process associated with Order_A 400, 400a includes 5 reporting points (RP) A1-A5 401-405 and the process associated with Order_B 400b includes 7 reporting points (RP) B1-B7 451-457. As previously described, a pre-split or original yield quantity 411p-415p, scrap quantity 421p-425p, and WIP quantity 441p-445p is associated with each of the reporting points A1-A5 401-405 as is a component and resource usage quantity 431p-435p. Mappings between RP A1 401-RP B1 451, RP A3 403-RP B6 456, and RP A5 405-RP B7 457 exist in this embodiment.

According to the embodiment shown in FIG. 4, 8 units of yield 461 are transferred from RP A1 401 to RP B1 451. Order_B 400b was placed for a quantity of 10 so the remaining 2 units need to be reflected in either scrap or WIP. No scrap 461s is transferred but 2 units of WIP 461w are transferred from RP A1 401. Additionally, the component and resource usage 471 for the 8 units of yield 461 is also transferred to RP B1 451. In conjunction with the transfer to RP B1 451, yield 411s and WIP 441s are decreased by 8 units 461 and 2 units 461w respectively to reflect the transfer. The component and resource usage 431s is also reduced but scrap 421s remains the same. At the next mapped reporting point in the parent order 400, RP A3 403, only 2 units of yield 466 are transferred to RP B6 456 representing a decrease in 6 units. Scrap or WIP need to be transferred to balance RP B6 456. No scrap 466s is transferred but 6 units of WIP 466w are transferred. Of the 6 units of WIP 466w to be transferred, only 3 units of WIP 443p are available at RP A3 403. The remaining 3 units of WIP are taken from the immediately preceding reporting point according to this embodiment of the present invention. The immediately preceding reporting point RP A2 402 has 4 units of WIP 442p available of which 3 units 490 are transferred to RP B6 456 even though RP A2 402 does not map to RP B6 456. The component and resource usage is also transferred. The 2 units of yield 466 transferred to RP B6 456 result in the transfer of their associated component and resource usage 473. As previously discussed the component and resource usage for non mapped reporting points are also transferred and, therefore, component and resource usage of 5 units 472 are transferred. In conjunction with the transfer to RP B6 456, yield 413s and WIP 443s, 442s are decreased by 2 units 466, 3 units 466w, and 3 units 490, 466w respectively to reflect the transfer. The component and resource usage 433s is also reduced but scrap 423s remains the same because no scrap 466s is transferred. At the next and last mapped reporting point in the parent order 400, RP A5 405, no yield 467 is transferred to RP B7 457 representing a decrease in 2 units from RP B6 456. Scrap or WIP need to be transferred to balance RP B7 457 but no scrap 467s is transferred. Of the 2 units of WIP 467w to be transferred, only 1 unit 445p is available at RP A5 405. The other unit of WIP 491 is taken from the immediately preceding reporting point, RP A4 404, which has 2 units of WIP 444p available. Component and resource usage is also transferred according to this embodiment. Because no yield 467 is transferred from RP A5 405, no component and resource usage 435p from RP A5 405 is transferred. However, component and resource usage 434p from RP A4 404 is transferred. In conjunction with the transfer to RP B7 457, WIP 445s, 444s is decreased by 1 unit each 467w at RP A5 405 and RP A4 404. The component and resource usage 434s is also reduced. As previously discussed, the post-split parent order 401 and child Order_B 403 remain balanced as was the original pre-split parent order 400. The additional WIP 490, 491 transferred from the previous reporting point (i.e., the "soft down" WIP) has not been processed to the level required for the mapped transfer. Therefore, this additional WIP 490, 491 may require reworking in the child order bring it up to the necessary level of the mapped reporting point in the child order.

A process similar to the above described "soft down" transfer of WIP from preceding reporting points may be used in another embodiment of the present invention to transfer additional WIP from subsequent reporting points. This "soft up" transfer of additional WIP functions similarly to the previously described "soft down" method except the transfer of WIP from subsequent reporting points may result in the transfer of component and resource usage for the prior reporting point and not the reporting point from which this "soft up" WIP is taken. The "soft up" additional WIP has received additional processing and may require reworking if the process structure in the child order to which it is transferred is different from the parent order.

What is claimed is:

1. A method for splitting a parent order in a flexible order transaction system while production of the parent order is in progress, comprising the steps executed by a computer processor of:
   receiving a request to split the parent order into at least one child order while production of the parent order is in progress, the request specifying a child order quantity for the child order;
   creating a child production process for the child order, the child production process including a plurality of reporting points;
   mapping at least two reporting points from a parent production process for the parent order to reporting points in the child production process; and
   for each mapped reporting point in the parent production process:
      selecting at least one quantity from among at least one of a yield, a scrap, and a work-in-process from the parent production process;
      splitting said selected quantity from the parent production process;
      transferring said selected quantity to a corresponding reporting point in the child production process as a function of the child order quantity; and
      for a reporting point in the parent order that does not map to any reporting point in the child order, transferring a resource usage and component usage to the child order as a function of the mapped reporting points.

2. The method according to claim 1, wherein the parent order is for the manufacturing of a product.

3. The method according to claim 1, wherein the yield quantity is a quantity of a product that is successfully processed.

4. The method according to claim 1, wherein the scrap quantity is a quantity of a product that is unsuccessfully processed and can't be reprocessed.

5. The method according to claim 1, wherein the work-in-process quantity is a quantity of a product that has not yet undergone processing.

6. The method according to claim 1, wherein the work-in-process quantity is at least one quantity selected from among product that has not yet undergone processing, product currently undergoing processing, and product that is unsuccessfully processed but can still be reprocessed.

7. The method according to claim 1, wherein the reporting points are mapped from the parent order to the child order as a function of a mapping table, the mapping table stored as part of the flexible order system.

8. The method according to claim 1, wherein the plurality of reporting points for the parent production process is different than the plurality of reporting points for the child production process.

9. The method according to claim 1, wherein the child production process has a different process structure than the parent production process.

10. The method according to claim 1, further comprising the step of:
   transferring, at each parent-child pair of corresponding reporting points, a preceding work-in-process quantity from a previous reporting point in the parent order to the mapped reporting point in the child order where the split work-in-process quantity to be transferred exceeds the work-in-process quantity available at the mapped reporting point in the parent order.

11. The method according to claim 1, further comprising the step of:
   transferring, at each parent-child pair of corresponding reporting points, a subsequent work-in-process quantity from a later reporting point in the parent order to the mapped reporting point in the child order where the split work-in-process quantity to be transferred exceeds the work-in-process quantity available at the mapped reporting point in the parent order.

12. A system for splitting a parent order in a flexible order transaction system while production of the parent order is in progress, comprising:
   a program memory;
   a storage device; and
   a processor, wherein the processor is adapted to:
      receive a request to split the parent order into at least one child order while production of the parent order is in progress, the request specifying a child order quantity for the child order;
      create a child production process for the child order, the child production process including a plurality of reporting points;
      map at least two reporting points from a parent production process for the parent order to reporting points in the child production process; and
      for each mapped reporting point in the parent production process;
         select at least one quantity from among at least one of a yield, a scrap, and a work-in-process from the parent production process;
         split said selected quantity from the parent production process;
         transfer said selected quantity to a corresponding reporting point in the child production process as a function of the child order quantity; and
         for a reporting point in the parent order that does not map to any reporting point in the child order, transfer a resource usage and component usage to the child order as a function of the mapped reporting points.

13. The system according to claim 12, wherein the yield quantity is a quantity of a product that is successfully processed.

14. The system according to claim 12, wherein the scrap quantity is a quantity of a product that is unsuccessfully processed and can't be reprocessed.

15. The system according to claim 12, wherein the work-in-process quantity is a quantity of a product that has not yet undergone processing.

16. The system according to claim 12, wherein the work-in-process quantity is at least one quantity selected from among product that has not yet undergone processing, product currently undergoing processing, and product that is unsuccessfully processed but can still be reprocessed.

17. The system according to claim 12, wherein the plurality of reporting points for the parent production process is different than the plurality of reporting points for the child production process.

18. The system according to claim 12, wherein the child production process has a different process structure than the parent production process.

19. The system according to claim 12, wherein the processor is further adapted to:
   transfer, at each parent-child pair of corresponding reporting points, a preceding work-in-process quantity from a previous reporting point in the parent order to the mapped reporting point in the child order where the split work-in-process quantity to be transferred exceeds the work-in-process quantity available at the mapped reporting point in the parent order.

20. The system according to claim 12, wherein the processor is further adapted to:
   transfer, at each parent-child pair of corresponding reporting points, a subsequent work-in-process quantity from a later reporting point in the parent order to the mapped reporting point in the child order where the split work-in-process quantity to be transferred exceeds the work-in-process quantity available at the mapped reporting point in the parent order.

21. A system for splitting a parent order in a flexible order transaction system while production of the parent order is in progress, comprising:
   a program memory;
   a storage device, the storage device containing a mapping table; and
   a processor, wherein the processor is adapted to:
      receive a request to split the parent order into at least one child order while production of the parent order is in progress, the request specifying a child order quantity for the child order;
      create a child production process for the child order, the child production process including a plurality of reporting points;
      retrieve mapping data from the mapping table;
      map at least two reporting points from a parent production process for the parent order to reporting points in the child production process according to the mapping data; and
      for each mapped reporting point in the parent production process;
         select at least one quantity from among at least one of a yield, a scrap, and a work-in-process from the parent production process;
         split said selected quantity from the parent production process;
         transfer said selected quantity to a corresponding reporting point in the child production process as a function of the child order quantity; and
      for a reporting point in the parent order that does not map to any reporting point in the child order, transfer a resource usage and component usage to the child order as a function of the mapped reporting points.

22. A computer-readable storage medium storing a set of instructions to be executed by a processor to implement a method for splitting a parent order in a flexible order transaction system while production of the order is currently in progress, the method comprising the steps of:
   receiving a request to split the parent order into at least one child order while production of the parent order is in progress, the request specifying a child order quantity for the child order;
   creating a child production process for the child order, the child production process including a plurality of reporting points;
   mapping at least two reporting points from a parent production process for the parent order to reporting points in the child production process; and
   for each mapped reporting point in the parent production process;
      selecting at least one quantity from among at least one of a yield, a scrap, and a work-in-process from the parent production process;
      splitting said selected quantity from the parent production process;
      transferring said selected quantity to a corresponding reporting point in the child production process as a function of the child order quantity; and
   for a reporting point in the parent order that does not map to any reporting point in the child order, transferring a resource usage and component usage to the child order as a function of the mapped reporting points.

* * * * *